US008888061B2

(12) United States Patent
Renderer

(10) Patent No.: US 8,888,061 B2
(45) Date of Patent: Nov. 18, 2014

(54) STRAP HOOK AND METHOD OF USE

(71) Applicant: Theodore D. Renderer, St. Louis, MO (US)

(72) Inventor: Theodore D. Renderer, St. Louis, MO (US)

(73) Assignee: Straphook, LLC, St. Louis, MO (US)

( * ) Notice: Subject to any disclaimer, the term of this patent is extended or adjusted under 35 U.S.C. 154(b) by 0 days.

(21) Appl. No.: 13/972,504

(22) Filed: Aug. 21, 2013

(65) Prior Publication Data
US 2014/0230196 A1    Aug. 21, 2014

Related U.S. Application Data

(63) Continuation-in-part of application No. 29/445,978, filed on Feb. 19, 2013.

(51) Int. Cl.
A47B 96/06 (2006.01)
F16B 45/00 (2006.01)

(52) U.S. Cl.
CPC ..................................... F16B 45/00 (2013.01)
USPC ................ 248/218.4; 248/229.17; 248/230.8; 248/304

(58) Field of Classification Search
CPC .......... F16M 13/02; E04H 12/22; H02B 5/02; G09F 2007/1804; F16B 45/00
USPC ........ 248/218.4, 219.3, 219.4, 229.17, 230.8, 248/301–304, 339, 341; 294/15, 152; 452/187, 192
See application file for complete search history.

(56) References Cited

U.S. PATENT DOCUMENTS

| 409,239 | A | * | 8/1889 | Roller | 248/304 |
| 939,318 | A | * | 11/1909 | Redman | 248/304 |
| 4,958,758 | A | | 9/1990 | Tipple et al. | |
| 5,159,729 | A | | 11/1992 | Walker | |
| 6,484,888 | B2 | * | 11/2002 | Miller | 211/5 |
| 7,726,619 | B2 | * | 6/2010 | Lien | 248/303 |
| 2002/0190531 | A1 | | 12/2002 | Holton et al. | |
| 2006/0180728 | A1 | | 8/2006 | Abrantes | |
| 2011/0120390 | A1 | | 5/2011 | Kung | |

* cited by examiner

Primary Examiner — Gwendolyn W Baxter
(74) Attorney, Agent, or Firm — Thompson Coburn LLP

(57) ABSTRACT

A strap hook has a hook portion and a strap portion. The hook portion has an attachment portion adapted to attach to an object. The hook portion has a stem portion extending from the attachment portion. The stem portion has a center axis defining swivel axis. The strap portion has opposite ends with a length extending between the ends. The strap portion has a hole with the hook portion stem portion extending through the hole. The stem portion has a retainer that releasably secures the hook portion to the strap portion and permits pivoting motion of the hook portion relative to the strap portion about the swivel axis. The retainer is selectively adjustable to set the amount of projection of the stem through the strap portion.

21 Claims, 3 Drawing Sheets

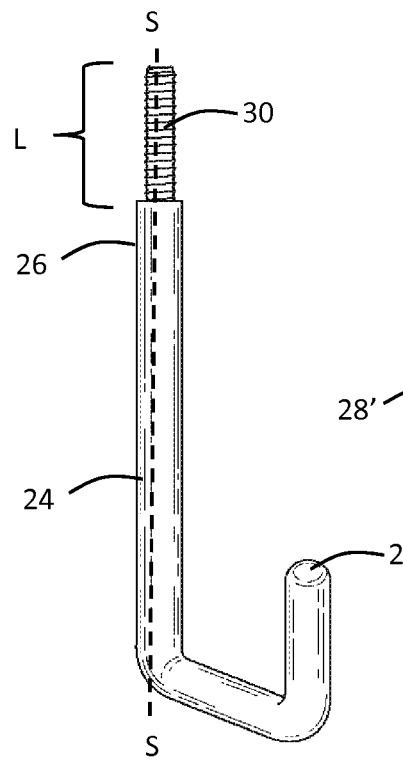
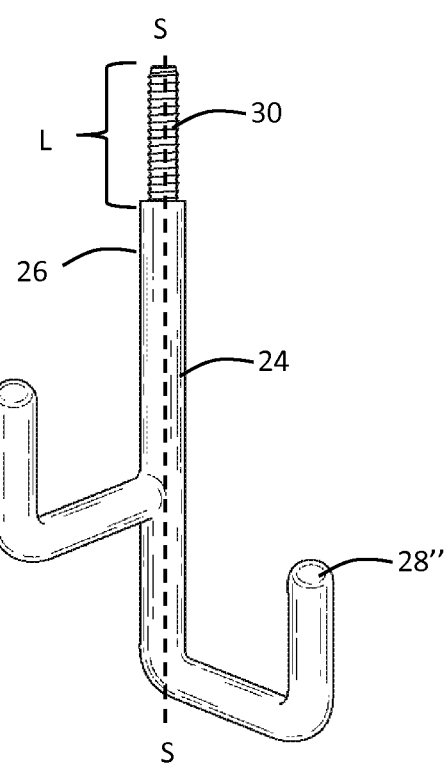
FIG. 6    FIG. 7
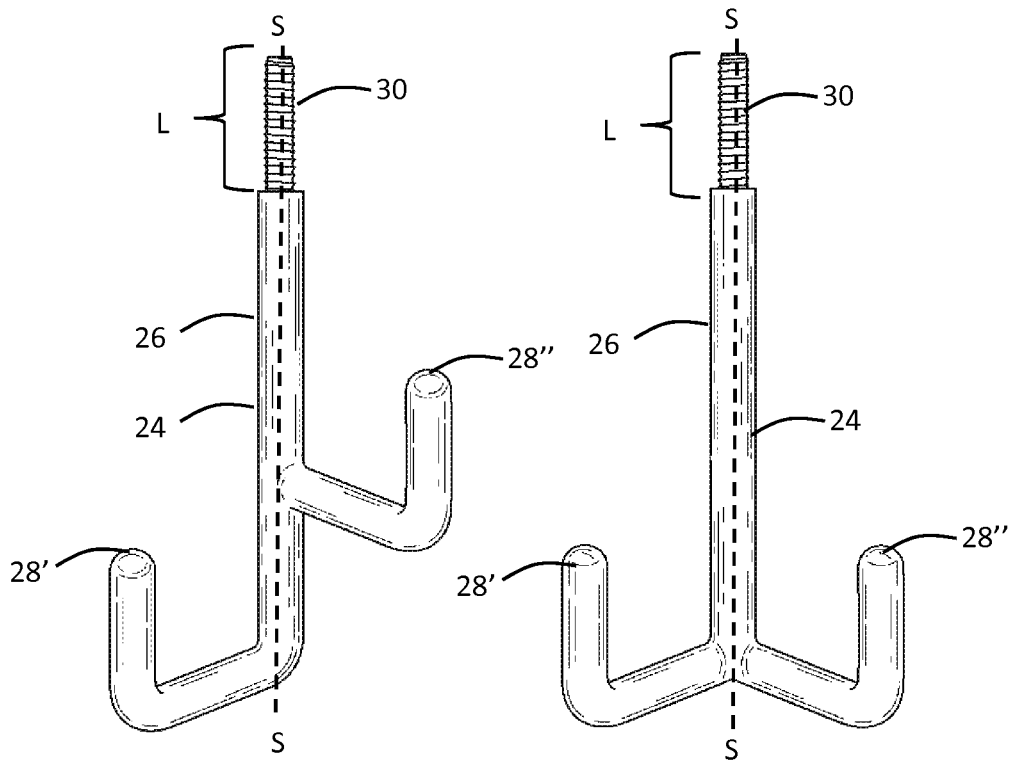
FIG. 8    FIG. 9

STRAP HOOK AND METHOD OF USE

RELATED APPLICATION DATA

This application is a continuation-in-part of application Ser. No. 29/445,978, filed Feb. 19, 2013, the disclosure of which is incorporated by reference herein.

BACKGROUND AND SUMMARY

This disclosure relates to a strap hook that has a hook portion and a strap portion. The hook portion is releasably attached to the strap portion. The hook portion is able to rotate or swivel relative to the strap portion about a swivel axis. The strap portion may have a releasable connector allowing the strap portion to be wrapped around or otherwise attached to an anchoring object. The hook portion has an attachment portion enabling the hook portion to be attached to a hooked object.

BRIEF DESCRIPTION OF THE DRAWINGS

FIGS. 6-9 show alternate embodiments of the hook portion of FIG. 1.

DETAILED DESCRIPTION

Figure 1:
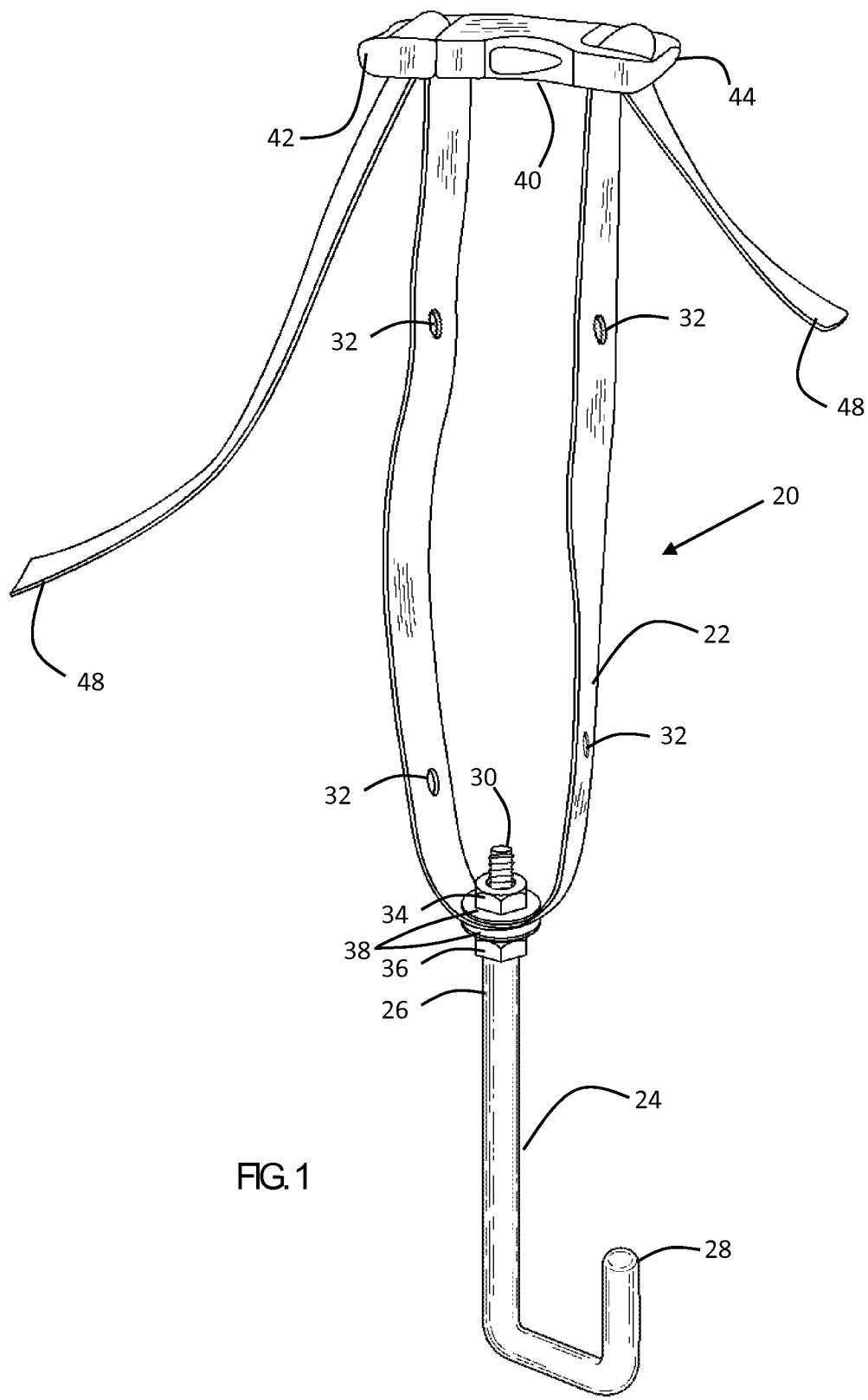
FIG. 1 shows a strap hook with a strap portion, a hook portion, and mating portions of a releasable connector connected together.
Figure 2:
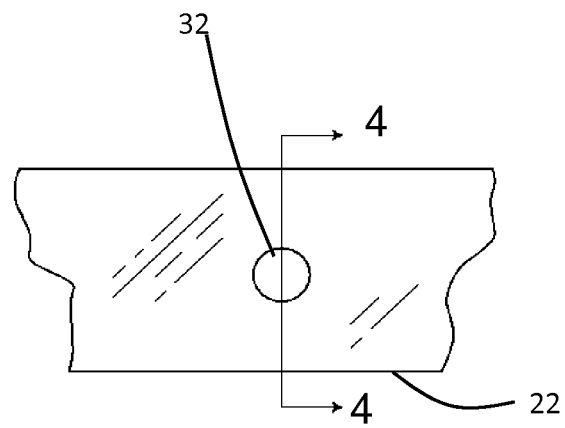
FIG. 2 shows a partial top view of the strap portion of the strap hook of FIG. 1, the bottom view being identical.

FIG. 1 shows the strap hook 20 comprising a strap portion 22 and a hook portion 24. The hook portion 24 comprises a stem portion 26 and an attachment portion 28 extending from the stem portion. As shown in FIGS. 1 and 6, the attachment portion 28 may be a single projection from the stem portion 26 giving the hook portion 24 a generally L-shaped appearance. FIGS. 7-9 show alternate embodiments of the hook portion 24 comprising multiple attachment portions 28',28" extending from the stem portion 26. It should be appreciated that the attachment portions may extend from the stem portion in other configurations rather than perpendicular configurations. For instance, the attachment portion(s) may extend from the stem portion in a generally curved manner to provide the hook with a generally J-shaped appearance. The attachment portion may also have a spring loaded clip or a pin (not shown) extending from a distal end of the attachment portion to secure the opening of the attachment portion once an object is hooked with the attachment portion.

The stem portion 26 has an extension 30 that may be directed through a hole 32 in the strap portion 22 for securing the hook portion 24 to the strap portion. The extension 30 of the hook portion 24 may be secured to the strap portion 22 with a retainer 34. In the drawings, the extension 30 is shown as a threaded member. Preferably, the threading of the extension 30 is uniform threading that will allow the use of a conventional nut as the retainer 34 which may be threaded onto the extension 30 of the stem portion 26 to releasably secure the strap hook to the strap. For instance, the threading on the extension may be #10×24 UNRC, ¼"×20 UNRC, or 5⁄16"×18 UNRC, or 3⁄8"×16 UNRC threading. Other sizes may also be used depending upon the loading and the intended application of the strap hook, and/or a diameter of the extension of the stem portion of the hook portion. A second nut 36 may also be provided to set a length L of the extension 30 that may extend through the hole 32. Washers 38 may be provided with the first and second nuts 34,36 on opposite sides of the strap adjacent the hole 32 to provide further reinforcement around the strap portion hole to prevent fretting wear on the nylon strap. The retainer 34 is set relative to the extension and strap portion so that hook portion is able to rotate or swivel relative to the strap portion in the hole 32 about a swivel axis S-S. For instance, in the drawings, first and second nuts 34,36 are relatively loosely fitted against the strap to allow the hook portion to swivel about axis S-S. Additionally, the position of the first and second nuts 34,36 may be adjusted by threading the nuts to a desired position on the extension to thereby set the length L and the relative position of the hook portion relative to the strap portion. While the drawing show the retainer as a nut, the retainer may comprise other releasable fasteners, such as cotter pins, snap rings, washers, rivets, grommets, pawls, press-fit washers, or deformable couplings which may be crimped into form around the extension of the stem portion. Alternatively, the stem portion may be provided with a boss (not shown) at a proximal end of the extension to provide a support for the underside of the strap portion in lieu of the second nut.

Figures 3, 4:
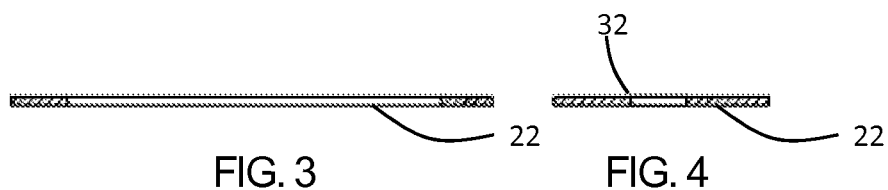
FIG. 3 shows a partial side view of the strap portion of FIG. 2, the opposite side view being identical.
FIG. 4 shows a cross-sectional view of the strap taken along lines 4-4 of FIG. 3.

The strap portion 22 comprises a length with the hole 32 formed in the length preferably centered on a width of the strap portion (FIG. 4). Reinforcing thicknesses of the strap portion (not shown) may be provided around the hole 32. For instance, extra material may be stitched to the strap portion around the hole. The hole may also have reinforced stitching or a grommet. Preferably, the strap is a nylon strap. In one embodiment, the strap portion may be one inch wide nylon strap with a 300 pound tensile strength with the hook portion having a stem portion threaded ¼"×20 UNRC. The strap portion may have a plurality of holes 32 arranged along its length centered on its width. Accordingly, one or more hook portions may be directed through any one of the holes of the strap portion along its length to provide versatile use of the strap hook.

Figure 5:
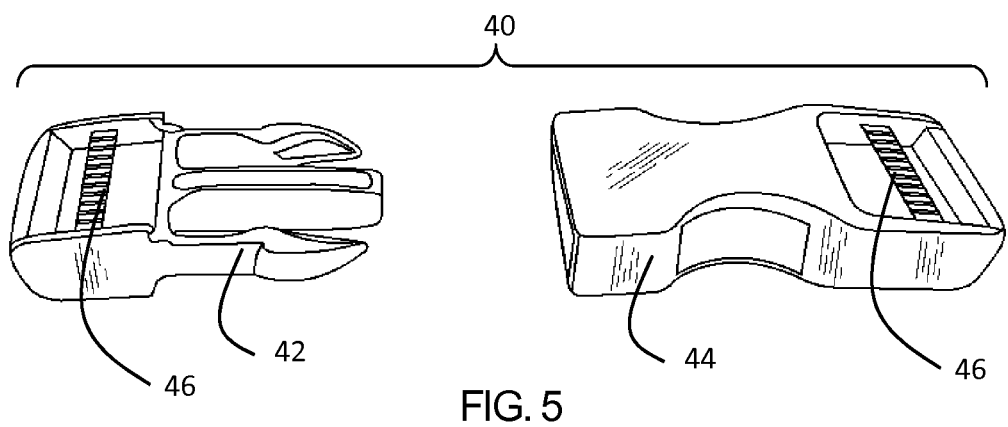
FIG. 5 shows the mating portions of the releasable connector of the strap hook of FIG. 1 apart.

The strap hook 20 may have a releasable connector 40 with mating portions 42, 44. The releasable connector 40 may be a snap buckle. In one embodiment, the snap buckle may be a parachute buckle. FIG. 5 provides additional detail of the snap buckle style releasable connector 40. The snap buckle male portion 42 and female portion 44 may snap release together. Each male and female portion 42,44 may have a rib 46, and a free end 48 of the strap portion 22 may be looped around the rib. By pulling on the free end 48 of the strap portion around the rib 46, the position of the snap buckle along the strap portion may be adjusted as necessary. The rib 46 may have knurling to limit slippage of the strap portion around the releasable connector 40. The drawings show a releasable connector 40 with the hook portion 24 positioned therebetween. This allows the strap hook 20 to be wrapped around an anchoring object with the releasable connector 40 connected, and tightened in place by pulling on the free ends 48 of the strap portion 22. While the drawings show a snap buckle, other types of releasable connectors may be provided on the strap portion. For instance, free ends of the strap portion may be connected together with hook and loop material or releasable snaps. The free ends of the strap portion may be tied together. One of the free ends of the strap portion may have a loop, and the other free end of the strap portion may be directed through the loop and attached back on itself to secure the strap hook around an object.

The strap hook shown herein has proven especially useful for hunting applications. In a hunting application, a releasable connector snap buckle may be provided on the strap portion with the hook portion positioned therebetween. The strap portion may be wrapped around a tree branch or tree trunk. The male and female portions of the releasable connector may be releasably connected together and the free ends of the straps may be pulled to tightly draw the strap portion around the tree trunk or tree branch. The hook portion with the open attachment portion of the hook portion provides a convenient location to mount a rifle or other hunting equipment. In a like manner, the strap hook may be used in camping applications for storing camping equipment in a tree. The strap hook may also be used to store equipment in a garage, barn, or shed by wrapping the strap hook around a truss beam or the like.

Alternatively, the strap hook may be used as a hold down for equipment. For instance, the attachment portion of the hook portion of the strap hook may be connected to a hooked object, and one free end of the strap portion may be connected to an anchor (with or without the releasable connector). Alternatively, the strap portion may have a male or female portion of the releasable connector on a free end of the strap portion that may be releasably connected to the mating portion of a releasable connector of a second strap hook, thereby allowing the strap portions of two strap hooks to be connected in series. The attachment portion of the hook portion of the second strap hook may be hooked to an anchor such as a cleat or other style of mount, and the attachment portion of the hook portion of the first strap hook may be connected to a hooked object.

The embodiments were chosen and described in order to best explain the principles and their practical application to thereby enable others skilled in the art to best utilize the various embodiments and modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A strap hook having a hook portion and a strap portion, the hook portion having an attachment portion adapted to attach to an object and a stem portion extending from the attachment portion and having a center axis defining a swivel axis, the strap portion having opposite ends with a length extending between the ends, the length having a hole in the length with the stem portion extending through the hole, the stem portion having a retainer releasably securing the hook portion to the strap portion and permitting pivoting motion of the hook portion relative to the strap portion about the swivel axis, the retainer being selectively adjustable to set an amount of projection of the stem portion through the strap portion.

2. The strap hook of claim 1 wherein the stem portion is uniformly threaded and the retainer comprises a nut.

3. The strap hook of claim 1 wherein the hook portion is generally "L"-shaped.

4. The strap hook of claim 1 wherein the hook portion is generally "J"-shaped.

5. The strap hook of claim 1 wherein the strap portion has a plurality of holes along its length.

6. The strap hook of claim 5 wherein a plurality of hook portions like the hook portion may be releasably secured to the strap portion.

7. The strap hook of claim 5 wherein the hook portion is releasably securable to any one of the plurality of holes in the strap portion along its length.

8. The strap hook of claim 1 wherein the hook portion has a plurality of attachment portions extending from the step portion.

9. The strap hook of claim 1 wherein the strap portion has a releasable connector.

10. The strap hook of claim 9 wherein the releasable connector has mating portions that releasably connect together.

11. The strap hook of claim 9 wherein at least one of the mating portions is selectively adjustable along the length of strap.

12. The strap hook of claim 9, wherein the mating portions of the releasable connector are adjacent to each free end of the strap portion.

13. A method comprising:
   accessing a hook portion, wherein the hook portion has an attachment portion adapted to attach to an object and a stem portion extending from the attachment portion, wherein the stem portion has a center axis defining a swivel axis;
   accessing a retainer adapted to be releasably engaged to the stem portion of the hook portion;
   accessing a strap portion, wherein the strap portion has opposite ends with a length extending between the ends, wherein the length has at least one hole in the length;
   directing the stem portion of the hook portion through the at least one hole of the strap portion; and
   releasably engaging the retainer to the stem portion in a manner to (i) releasably secure the hook portion to the strap portion, (ii) permit pivoting motion of the hook portion relative to the strap portion about the swivel axis, and (iii) set an amount of projection of the stem portion through the strap portion.

14. The method of claim 13 wherein the stem portion is uniformly threaded and the retainer comprises a nut.

15. The method of claim 14 wherein the step of releasably engaging the retainer to the stem portion includes threading the retainer onto the stem portion.

16. The method of claim 13 wherein the strap portion has a plurality of holes along its length.

17. The method of claim 16 wherein a plurality of hook portions like the hook portion may be releasably secured to the strap portion.

18. The method of claim 17 wherein the step of directing the stem portion of the hook portion through the hole in strap portion includes selecting the hole from any one of the plurality of holes in the strap portion along its length.

19. The method of claim 13 wherein the hook portion has a plurality of attachment portions extending from the step portion.

20. The method of claim 13 further comprising selectively positioning mating portions of a releasable connector on opposite ends of the length of the strap portion.

21. The method of claim 20, further comprising releasably connecting the mating portions of the releasable connector together with the strap portion around an object and the hook portion between the mating portions of the releasable connector.

* * * * *